(No Model.)
B. F. RADFORD.
PULLEY.
No. 355,555. Patented Jan. 4, 1887.
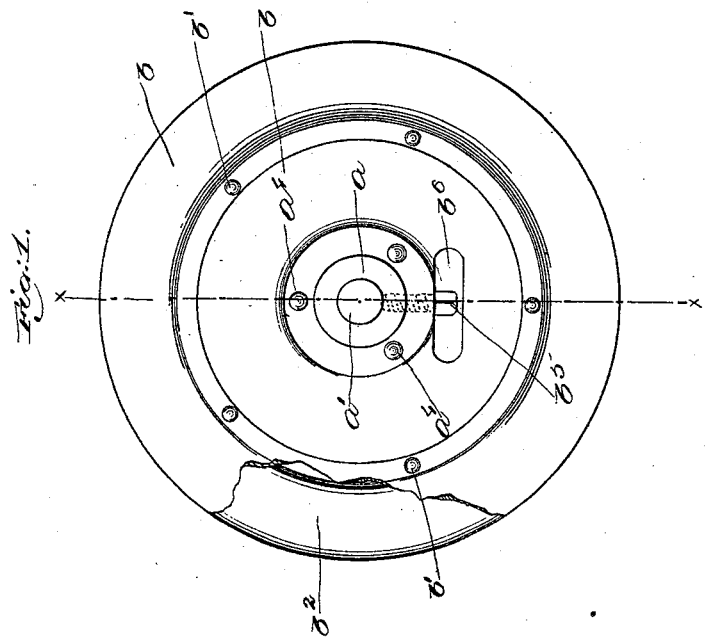
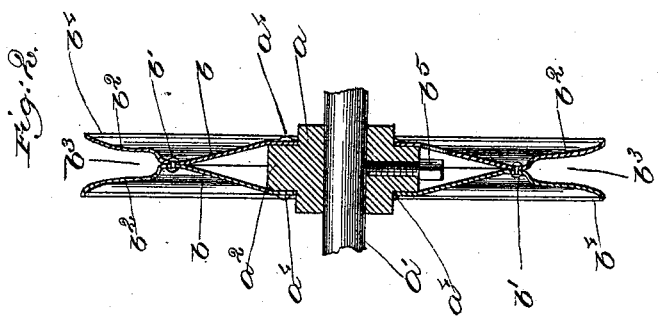
Witnesses
Arthur Zipperlen.
John F. C. Pranklin
Inventor
Benjamin F. Radford
By Crosby & Gregory attys

UNITED STATES PATENT OFFICE.

BENJAMIN F. RADFORD, OF HYDE PARK, MASSACHUSETTS.

PULLEY.

SPECIFICATION forming part of Letters Patent No. 355,555, dated January 4, 1887.

Application filed August 17, 1886. Serial No. 211,106. (No model.)

*To all whom it may concern:*

Be it known that I, BENJAMIN F. RADFORD, of Hyde Park, county of Norfolk, and State of Massachusetts, have invented an Improvement in Pulleys, of which the following description, in connection with the accompanying drawings, is a specification, like letters on the drawings representing like parts.

This invention relates to pulleys for machinery, shafting, &c., and has for its object to produce a light, yet strong and efficient pulley.

My invention consists of a pulley composed of a hub provided with a collar, and two connected disks embracing the said collar and secured thereto, the said disks being spun or struck up to present between their contiguous surfaces, outside the point where the disks are secured together, a flaring groove for the reception of a suitable belt or band, as will be described.

One of the disks has a slot at one side, near the hub, to enable a wrench to be applied to the set-screw employed to confine the hub of the pulley to the shaft.

Figure 1 is a side elevation, partially broken out at one edge, of a pulley constructed in accordance with my invention, and Fig. 2 a vertical section of Fig. 1 on the line $x\ x$.

The hub $a$, adapted to be fitted upon a shaft, $a'$, is, for the best results, provided with a collar, $a^2$. This collar $a^2$ is embraced by two disks, $b$, spun or struck up from sheet metal, in manner well understood, to give to the said disks the shape best shown in Fig. 2, the said disks being united to the sides of the collar by rivets $a^4$, or equivalent bolts or screws, and together by suitable rivets, as $b'$, so as to leave between the inner sides of the portions $b^2$ a flaring groove or portion, $b^3$, with a rounded bottom.

Each disk $b$ is provided near its circumference with a lip, $b^4$, shaped substantially as shown in Fig. 2. The line of junction of the said disks $b\ b$ is substantially in line with the center of the length of the hub $a$.

Thin sheet metal, preferably steel, is light, yet a pulley made from such metal is very strong.

My improved pulley may be employed instead of wooden or iron pulleys.

To secure the pulley to the shaft $a'$, the hub $a$ is tapped through the shouldered part $a^2$ thereof and provided with a set-screw, $b^5$, the said screw in practice being fitted to the hub $a$ before the disks are united together.

To enable the set-screw $b^5$ to be screwed or unscrewed, to thereby fasten or loosen the pulley on its shaft, I have herein shown one of the disks $b$ as provided with a slot, $b^6$, opposite the head of the said screw, as shown in Fig. 1.

By fitting the screw $b^5$ to the hub $a$ before securing the disks $b^3$ thereto I am enabled to obviate the employment of a large slot, which would otherwise be necessary to use in one or both disks, the said large slot, if made large enough to insert the set-screw after the disks are united to the hub, materially diminishing the strength of the pulley.

Placing the set screw $b^5$ between the disks $b\ b$, when it is guarded, obviates liability of clothing catching upon it, thus making my improved pulley very desirable for running sewing-machines and other light machinery.

I claim—

1. A pulley for machinery, shafting, &c., consisting of a hub provided with the collar $a^2$, and independent disks $b\ b$, embracing said collar and secured thereto by bolts or rivets $a^4$, combined with bolts or rivets to unite said disks together to leave a flaring groove, $b^3$, substantially as specified.

2. The hub tapped to receive a screw by which the said hub is fastened to its shaft, and a set-screw, $b^5$, combined with two independent disks, shaped substantially as described, and united to the said hub and to each other to leave a flaring groove for the reception of a belt, one of the said disks having a slot, $b^6$, through which to reach the head of the said set-screw, as and for the purpose set forth.

In testimony whereof I have signed my name to this specification in the presence of two subscribing witnesses.

BENJ. F. RADFORD.

Witnesses:
G. W. GREGORY,
C. M. CONE.